United States Patent [19]
Young

[11] 3,867,512
[45] Feb. 18, 1975

[54] METHOD OF PREPARING CRYSTALLINE "L" ZEOLITE

[75] Inventor: Dean Arthur Young, Yorba Linda, Calif.

[73] Assignee: Union Oil Company of California, Los Angeles, Calif.

[22] Filed: Sept. 14, 1972

[21] Appl. No.: 289,085

Related U.S. Application Data

[63] Continuation-in-part of Ser. No. 856,830, Sept. 10, 1969, abandoned.

[52] U.S. Cl.................. 423/329, 423/118, 423/328, 252/455.2
[51] Int. Cl...................... C01b 33/26, C01b 33/28
[58] Field of Search .......... 423/329, 330, 328, 118; 252/455 Z

[56] References Cited
UNITED STATES PATENTS

| | | | |
|---|---|---|---|
| 3,216,789 | 11/1965 | Breck et al. | 423/328 |
| 3,298,780 | 1/1967 | Fleck | 423/329 |
| 3,366,578 | 1/1968 | Michalko | 252/455 Z |
| 3,484,194 | 12/1969 | Hindin et al. | 423/329 |

OTHER PUBLICATIONS

Iler "The Colloid Chemistry of Silica and Silicates," 1955, pages 139–140.

*Primary Examiner*—Edward Stern
*Attorney, Agent, or Firm*—Lannas S. Henderson; Michael H. Laird; Richard C. Hartman

[57] ABSTRACT

Crystalline zeolite L is prepared in high yields from reactive silica gels having chemical water contents in excess of about 4.5 weight percent. The reactive silicas are preferably prepared by gelling a selected silica source at a pH below about 5.

4 Claims, No Drawings

METHOD OF PREPARING CRYSTALLINE "L" ZEOLITE

This application is a continuation-in-part of my co-pending application Ser. No. 856,830, filed Sept. 10, 1969, now abandoned.

BACKGROUND

Numerous synthetic aluminosilicates have been prepared from a variety of silica and alumina sources. In U.S. Pat. No. 3,216,789, Breck et al. suggest the use of a variety of silicas including silicic acid, aqueous colloid silica sols, reactive amorphous solid silicas such as "Santocel," "Cab-O-Sil," "Hi-Sil," powdered "Vycor" glass, "Quoso," etc., silica gels and silicic acid for producing zeolite L. In other words, it is suggested that any silica considered suitable for preparing any synthetic aluminosilicate can be used to make zeolite-L. However, it has also been observed that the "reactive" forms of silica having very high surface areas, usually attributable to minute particle sizes, such as the fume silicas, pyrogenic silicas and precipitated silica sols are more readily converted to certain zeolites than are alternative silica sources.

All of these reactive silicas are considerably more expensive than several of the alternative forms and several possess characteristics which render their use in aqueous digestion systems undesirable. The very fine particle size silica hydrosols exemplified by "Ludox" described in U.S. Pat. No. 2,597,782 and 2,574,902 are prepared by exhaustive ion exchange of dilute sodium silicate solutions followed by carefully controlled concentration and stabilization. The resulting hydrosols are several times as costly as sodium silicate on an equivalent $SiO_2$ basis. Most of the "amorphous solid silicas" are prepared from silica hydrosols and accordingly are even more expensive, as are the dry aerogels and flame blown silicas of which "Cab-O-Sil" is representative. Moreover, these aerogels and flame blown silicas are fluffy, submicron size powders having very low bulk densities which render their use in aqueous systems quite difficult since they tend to form non-dispersible gelatinous mixtures.

It is, therefore, one object of this invention to provide a method for the preparation of zeolite-L. It is another object of this invention to provide a method for the preparation of zeolite-L from inexpensive readily available silica sources. It is yet another object of this invention to provide a method for the preparation of zeolite-L which enables the more economic utilization of zeolite precursors. Another object is to improve conversion of reactants to crystalline zeolite-L.

In accordance with one embodiment of this invention crystalline zeolite-L is produced by reacting a silica gel having a chemical water content above about 4.5 weight percent with a source of alumina in an aqueous reaction medium having a composition expressed as oxide mole ratios of about 0.3 to about 1 $K_2O/(K_2O + Na_2O)$, about 0.3 to about 0.6 $(K_2O+Na_2O)/SiO_2$, about 10 to about 40 $SiO_2/Al_2O_3$ and about 15 to about 140 $H_2O/(K_2O+Na_2O)$, at a temperature and for a period of time sufficient to form crystalline zeolite-L.

In another embodiment L-zeolite is formed in high yields by the reaction of an alumina source and a reactive silica gel formed by syneresis at a temperature above about 100°F and a pH below about 8 sufficient to produce a gel having a chemical water content of at least about 4.5 weight percent. Even higher temperatures on the order of 150°F and above are preferred in this embodiment.

Such reactive silica gels can be prepared at temperatures of about 30° to about 250°F and pH levels below about 8. Higher temperatures can be used if facility is provided for maintaining pressure on the system. For convenience, temperatures below 250°F are usually employed. However, suitable gels cannot be prepared at the higher pH levels and lower temperatures. Thus it is necessary to correlate the temperature and pH level at which the gel is produced in order to assure the resulting product will have a chemical water content of at least about 4.5 weight percent. However, silica gels having this characteristic can be prepared throughout this temperature range at the lower pH levels, i.e., below about 5, preferably below about 3.

This method is based on the discovery that silica gels containing at least about 4.5 weight percent water react with alumina sources to form zeolite-L much more readily and with higher efficiency than do other silicas. The silica gels formed at low pH below about 5 are presently preferred due to their superior activity in these systems. The superiority of these gels is unexpected since they are not superior Y zeolite precursors. In fact the use of low pH gels having high water levels often results in the production of no Y zeolite whatever. The results obtained with zeolite Y suggest that if any difference in reactivity or conversion level exists between the numerous alternative silica sources, it is that silicas prepared in less acidic media are more reactive. I have now discovered that, to the contrary, silica gels having high chemical water levels, and preferably those prepared in more acidic media, or alternatively at higher temperatures, are much more reactive for the formation of zeolite-L in the systems described herein.

The reactive silica gel, as formed, should have a relatively high chemical water content of at least about 4.5 weight percent. Such gels are much more reactive for the production of L zeolite than are available alternatives formed under conditions which result in lower chemical water levels. They are usually prepared at pH levels below about 8 under conditions sufficient to produce a product having a chemical water content in excess of about 4.5 weight percent.

Gelling temperature has a significant influence on chemical water content. Higher chemical water levels are obtained at higher temperatures. Similarly, chemical water level increases as the gelling pH is reduced. Thus, temperature and pH must be correlated to obtain a reactive silica.

For example, highly reactive gels cannot be obtained at a pH of 8 at relatively low gelling temperatures, i.e., on the order of 40°F. Higher gelling temperatures are required at these pH levels. However, reactive gels having chemical water levels in excess of 4.5 weight percent can be obtained at relatively low gelling temperatures when the gel is synerized at pH levels below about 5.

The temperatures maintained during gel formation must of course exceed the freezing point of the aqueous medium. Thus temperatures in excess of 30°F are generally employed. The upper end of the temperature range is usually limited by the need for pressurized equipment at temperatures in excess of boiling point. Thus, gelling temperatures are usually within a range of about 30° to about 250°F.

Investigations of the relative influence of temperature and pH indicate that the chemical water content of the gel usually follows the expression:

$$H_2O = 4 + 0.0056\ T - 0.4\ pH$$

wherein T is the gelling temperature in degrees Rakine. Other variables such as silica concentration effect the validity of this expression somewhat. Nevertheless, it does provide a means for correlating temperature and pH as a preliminary step to establishing optimum reaction conditions. The optimum conditions of temperature, pH and silica content can be easily determined experimentally by producing gels at several pH levels, temperatures and silica concentrations, determining the resultant chemical water content of the gel, and selecting the optimum conditions accordingly.

A simple procedure for determining chemical water content involves drying the gel at 110°C for 16 hours to expel physically bound water and then determining weight loss of the dried gel upon heating at 1,100°C for 2 hours.

A variety of gel precursors can be employed to produce these materials. Exemplary of these are the alkali metal, alkaline earth metal and ammonium silicates and silicic acid. Silica concentration should correspond to a $SiO_2/H_2O$ mole ratio of at least about 0.005 in order to produce a relatively concentrated gel which can be easily separated from the aqueous phase. Lower silica concentration can be employed although they are not preferred due to handling difficulty and the need for unfeasibly long contact times. Somewhat higher equivalent $SiO_2/H_2O$ ratios within a range of about 0.01 to about 0.1 are generally employed, the higher concentrations being preferred due to ease in handling and shorter gelling times.

Although a wide range of conditions can be employed to produce these gels, it is more expedient to use relatively high silica concentrations and elevated solution temperatures, both of which contribute to gellation rate and gel reactivity. As a result, preferred solution temperatures usually range from about 80° to about 200°F. At these temperatures and concentration levels, stable gels can be formed in about 5 minutes. Nevertheless the gels can be more easily handled and more readily separated and purified if syneresis is allowed to continue for longer periods of up to 20 minutes to about 2 hours.

An alternative procedure involves the acidification of a basic silicate or silicic acid in an aqueous medium at a pH of about 0 and then increasing the pH to a value in excess of about 5, and preferably less than about 3. The solution pH will raise slightly due to the neutralizing effect of the basic silicate. However, additional base can be added such as ammonium or alkali and alkaline earth metal hydroxides, carbonates and the like.

Essentially any acid which will neutralize the basic silicate can be employed in this step of the procedure. Illustrative acids are the strong mineral acids such as sulfuric, hydrochloric, nitric and phosphoric and organic acids such as formic, acetic and the like.

Following the desired degree of aging, the silica gel is separated from the supernatant liquid and water washed to remove residual acid. The resulting gel can be employed directly in the preparation of the aluminosilicates hereinafter detailed with or without mild drying or calcination. However, additional improvement in the suitability of these gels as reactants in the production of zeolite-L can be achieved by calcination prior to contacting in the aluminosilicate reaction medium. Although calcination is not essential due to the enhanced activity of these materials' post treatment at temperatures of about 400° to about 1,800°F, preferably above about 600°F for about 30 minutes to about 2 hours serves to further increase reactivity. Obviously such thermal treatment will reduce the gel water content. Nevertheless I have found that the use of gels having high chemical water levels as such is not essential. The essential requirement appears to be the use of a gel that was formed under conditions which resulted in a high chemical water content even if some or all of the chemical water is later expelled by calcination.

The resulting silica source is contacted with a suitable alumina source in an aqueous medium having a composition expressed as oxide mole ratios of about 15 to about 140 $H_2O/(K_2O+Na_2O)$ from about 0.3 to about 0.6 $(K_2O+Na_2O)/SiO_2$, from about 10 to about 40 $SiO_2/Al_2O_3$. It has also been found that the presence of minor amounts of sodium in the metal-aluminosilicate reaction mixture expedites the production of zeolite —L particularly in the potassium form. Consequently, it is often desirable to employ sodium concentrations within the range of up to about 2 $Na_2O/K_2O$.

Although crystalline zeolite-L can be readily recovered from all reaction mixtures within the above described ranges, it has been observed that varying amounts of dissimilar byproducts are produced depending upon the particular reactant ratios employed. The resolution of such byproducts can be greatly reduced by employing reactant concentrations within the range of from about 10 to about 30 $SiO_2/Al_2O_3$, about 15 to about 40 $H_2O/(K_2O+Na_2O)$, and about 0.3 to about 0.5 $(K_2O+Na_2O)SiO_2$.

Essentially any form of reactive alumina can be employed in the preparation of zeolite-L by these methods. Illustrative of such alumina sources are alumina trihydrate, activated alumina, alkali metal aluminates, e.g., sodium aluminate, potassium aluminate, etc., gamma alumina, alumina containing clays such as kaolin and the like, potassium aluminate being presently preferred. When an alumina source other than potassium aluminate is employed, the required potassium concentration can be derived from potassium hydroxide or one or more ionizable potassium salts such as the sulfate, halides, nitrate carbonate, acetate, formate, citrate and the like.

The zeolite-L is prepared by dispersing the alumina, alkali and silica sources in water under any of a wide range of conditions. Reaction temperatures can range from 140° to about 280°F. although temperatures of about 180° to 230°F. are generally preferred due to reaction rate and system vapor pressure. Product crystals can be separated from the reaction medium by any suitable method such as filtration. Purification is easily accomplished by water washing and mild drying if preferred. Contact times are usually at least about 30 minutes and are generally within the range of about 1 to about 48 hours.

The following examples illustrate the concept of this invention and are not intended to be limiting thereof.

EXAMPLE 1

A 1050 ml portion of "N-Brand" sodium silicate was diluted with 4000 ml of water to form a solution which was then added to 380 ml of 12 normal sulfuric acid. Immediately following admixture of the silicate and acid solutions, the pH was adjusted to 4.0 by the addition of 15 normal ammonium hydroxide. The resulting system was allowed to stand for 30 minutes at 75°F. at which time the first signs of gelation became apparent. At that time, i.e., after 30 minutes, sufficient additional ammonium hydroxide was added to the system to increase the pH to 9.0, whereupon the system set into a firm gel. The resulting gel was water washed to remove acid and soluble salts and dried for 16 hours at 212°F. The dried gel was then ground into particulate form through a 0.010-slotted screen.

EXAMPLE 2

A 2100 ml portion of "N-Brand" sodium silicate was diluted with 8000 ml of water. The resulting solution was then added to an excess of sulfuric acid, 702 ml of 12 normal $H_2SO_4$. Immediately following the combination of the silicate and acid the pH of the resulting system was adjusted to 6.0 by the addition of 15 normal ammonium hydroxide. The occurrence of gelation became apparent immediately upon the addition of the ammonium hydroxide after which the pH was adjusted further upwardly to 7.6 by the addition of ammonium hydroxide and the system was allowed to set a firm gel. The resulting gel was washed, dried and granulated as described in Example 1.

EXAMPLE 3

A 755 ml portion of "N-Brand" sodium silicate was admixed with 970 ml of water to form a solution which was then added gradually to 432 ml of 12 normal sulfuric acid. The original pH of the solution was 0. However, after standing for 48 hours to enable the system to set to a firm gel the pH had risen to a value of 1.2. The resulting gel was washed, dried and granulated as described in Example 1.

EXAMPLE 4

A 2100 ml portion of "N-Brand" sodium silicate was diluted with 8400 ml of water and added gradually to 702 ml of 12 normal sulfuric acid. Immediately following the combination of the silicate and acid solutions the pH of the system was adjusted to 7.0 by the addition of 15 normal ammonium hydroxide. The resulting system quickly set to a firm gel at a pH of 7, which was then washed, dried and granulated as described in Example 1.

EXAMPLES 5–9

These silicas and a sample of "Ludox-HS" silica sol were separately mixed with potassium aluminate and water in amounts sufficient to form a metal-aluminosilicate reaction mixture having the following composition represented as oxide mole ratios: $H_2O/K_2O = 90$; $K_2O/SiO_2 = 0.40$; $SiO_2/Al_2O_3 = 20$. The slurries were aged in a pressure vessel under system vapor pressure at 240°F for 68 hours. The respective products were filtered, water washed and dried at 220°F for 16 hours. The relative percent crystallinities of the products were determined by X-ray diffraction and comparison to a standard zeolite-L sample. These values are listed in the Table.

| | Silica Source | | | | | Product |
|---|---|---|---|---|---|---|
| Ex.No. | Gel | Gelling pH | $SiO_2/H_2O$ Mole Ratio | Gelling Temp.°F | Drying Temp.°F | Chemical Water Wt. % | Relative Wt.% Zeolite-L |
| 5 | Exp.1 | 4.0–9.0 | 0.024 | 75 | 212 | 3.97 | 74 |
| 6 | Exp.2 | 6.0–7.6 | 0.024 | 75 | 212 | 3.75 | 51 |
| 7 | Exp.3 | 0–1.2 | 0.053 | 75 | 212 | 7.00 | 169 |
| 8 | Exp.4 | 7.0 | 0.023 | 75 | 800 | — | 106 |
| 9 | Ludox | — | — | — | — | 68[1] | 180 |

[1] total water content

Comparison of these results evidences the substantial advantage obtained by the use of silica gels formed at a pH of up to about 3 and calcined silicas. The activity of the silica gel prepared at a pH of 0 (Ex. No. 7) approached the activity of the expensive highly refined Ludox employed in Ex. No. 9. The calcined silica gel of Ex. No. 8, formed at a pH of 7.0 and calcined for a period of 2 hours at 800°F, was 100 percent more active than the uncalcined silica of Ex. No. 6.

EXAMPLES 10–15

Six additional L-zeolite preparations were made using the procedures described above. The conditions employed and results obtained are illustrated in the following Table.

| Ex. No. | Gelling Conditions pH | $SiO_2/H_2O$ | Temp.°F | Chemical Water, Wt.% | Relative Wt.% Zeolite-L |
|---|---|---|---|---|---|
| 10 | 7.6–7.9 | 0.024 | 75 | 3.96 | 27 |
| 11 | 1.3–1.1 | 0.024 | 75 | 6.29 | 151 |
| 12 | 2.6–2.4 | 0.024 | 75 | 5.31 | 143 |
| 13 | 2.0–1.9 | 0.024 | 75 | 5.07 | 165 |
| 14 | 5.9–6.1 | 0.024 | 200 | 5.01 | 145 |
| 15 | 3.6–3.7 | 0.020 | 200 | 6.22 | 156 |

I claim:

1. In a method for the preparation of crystalline zeolite L wherein reactive silica is dispersed in an alkaline reagent to form an aqueous reaction mixture having a molar composition corresponding to about 0.3 to about 1 $K_2O/(K_2O+Na_2O)$, about 0.3 to 0.6 $(K_2O+Na_2O)/SiO_2$, about 10 to 40 $SiO_2/Al_2O_3$, and about 15 to 140 $H_2O/(K_2O+Na_2O)$, and wherein said reaction mixture is digested at a temperature and for a period of time sufficient to produce a recoverable yield of zeolite L, the improved method for increasing the rate of formation and/or yield of L zeolite, which comprises utilizing as said reactive silica a reactive silica gel prepare by gelling a silica source selected from the group consisting of alkali metal, akaline earth metal and ammonium silicates and silicic acid in an aqueous solution having a silica concentrate corresponding to a $SiO_2/H_2O$ mole ratio of at least about 0.005 at a pH below about 8 and a temperature between about 30° and 250°F, correlated with said pH to produce a reactive silica gel containing at least about 4.5 weight percent of chemical water.

2. The method of claim 1 wherein said reactive silica gel is formed by gelling said silica source in the presence of a strong mineral acid, the silica concentration in said aqueous solution corresponds to a $SiO_2/H_2O$ mole ratio of at least about 0.01, and said aqueous reaction mixture has a composition corresponding to about 0.3 to about 0.5 $(K_2O+Na_2O)/SiO_2$, about 10 to about 30 $SiO_2/Al_2O_3$, and about 15 to about 40 $H_2O/(K_2O+Na_2O)$.

3. The method of claim 1 wherein said silica source is selected from sodium and potassium silicates, said alumina source is potassium aluminate, and said silica gel containing at least about 4.5 weight percent chemical water is formed by gelling said silica source in the presence of a strong mineral acid.

4. A method as defined in claim 3 wherein said gelling step is carried out at a pH below about 5.

* * * * *